United States Patent
Kim et al.

(10) Patent No.: US 9,172,412 B2
(45) Date of Patent: Oct. 27, 2015

(54) REDUCING ELECTROMAGNETIC RADIATION EMITTED FROM HIGH-SPEED INTERCONNECTS

(71) Applicants: Andrew Joo Kim, Suwanee, GA (US); David Anthony Stelliga, Half Moon Bay, CA (US)

(72) Inventors: Andrew Joo Kim, Suwanee, GA (US); David Anthony Stelliga, Half Moon Bay, CA (US)

( * ) Notice: Subject to any disclaimer, the term of this patent is extended or adjusted under 35 U.S.C. 154(b) by 0 days.

(21) Appl. No.: 14/205,082

(22) Filed: Mar. 11, 2014

(65) Prior Publication Data

US 2014/0254730 A1    Sep. 11, 2014

Related U.S. Application Data

(60) Provisional application No. 61/776,526, filed on Mar. 11, 2013.

(51) Int. Cl.
*H03D 1/04* (2006.01)
*H04B 1/10* (2006.01)

(52) U.S. Cl.
CPC ................................ *H04B 1/10* (2013.01)

(58) Field of Classification Search
None
See application file for complete search history.

(56) References Cited

U.S. PATENT DOCUMENTS

| 2007/0242955 | A1* | 10/2007 | Kavehrad | 398/130 |
| 2013/0235906 | A1* | 9/2013 | Kim et al. | 375/144 |
| 2014/0085098 | A1* | 3/2014 | Stolpman et al. | 340/854.4 |

* cited by examiner

*Primary Examiner* — Adolf Dsouza
(74) *Attorney, Agent, or Firm* — Trellis IP Law Group, PC

(57) ABSTRACT

Systems and methods reduce electromagnetic interference from high speed data carried by wired interconnects with a radio receiver for at least one protected radio frequency band. A spectral encoder changes the encoding of the high speed data to modify its frequency spectrum and reduce its spectral in the protected frequency band. The wired interconnect carries the spectrally encoded data to its destination, where it is spectrally decoded back to its original form. Spectral encoding may include polynomial scrambling. The data may be encoded with different coding parameters in parallel and the best result selected for communication over the wired interconnect. The coding parameters may be changed depending on which radio receivers and/or protected frequency bands are in use at any given time.

17 Claims, 18 Drawing Sheets

REDUCING ELECTROMAGNETIC RADIATION EMITTED FROM HIGH-SPEED INTERCONNECTS

CROSS REFERENCES TO RELATED APPLICATIONS

This application claims priority from U.S. Provisional Patent Application Ser. No. 61/776,526, entitled "Reducing Electromagnetic Radiation Emitted from High-Speed Interconnects," filed on Mar. 11, 2013, which is hereby incorporated by reference herein for all purposes.

BACKGROUND

A broad array of electronic systems comprise both a high-speed wired interconnect and a wireless radio receiver. A wired interconnect carrying high-speed data has the undesired effect of radiating part of its electromagnetic (EM) energy, which may result in loss of data fidelity in the wired interconnect on the one hand, and in interference with a radio receive signal on the other hand. The spectrum of electromagnetic interference (EMI) emitted from high-speed wired interconnects may be broad, whereas radio receive signals are typically in a relatively narrow radio frequency range. Unfortunately, high-speed interconnect protocols are generally optimized for data transfer fidelity over the intended wired link and disregard the problem of EMI with wireless radios.

FIG. 1 illustrates an example conventional system 100 with a radio receiver 150 receiving interference radiated from one or more full or partial wired interconnects. With respect to drawings herewith, receivers, whether wired or wireless, may be indicated as Rx, whereas transmitters may be indicated as Tx. The radio receiver 150 generally operates to receive radio signals 142 transmitted by radio transmitter 140, which is generally located outside the system 100. The radio signal 142 may be very weak if the transmitter 140 is at a large distance, or in other words, the capability of radio receiver 150 to receive signals from a faraway transmitter 140 is determined by its capability to receive a weak radio signal 142. EMI that overlaps the spectrum or the frequency range of radio signal 142 generally reduces such capability.

System 100 may include one or more partial or full high-speed wired interconnects. For example, it may partially include wired interconnect 110, comprising a transmitter 110.1 outside of system 100 and a receiver 110.3 inside system 100, electrically coupled by wired link 110.2. Similarly, system 100 may fully include wired interconnect 120, comprising transmitter 120.1, wired link 120.2, and receiver 120.3. Again similarly, system 100 may partially include wired interconnect 130, comprising a transmitter 130.1 inside of system 100 and a receiver 110.3 outside, electrically coupled by wired link 130.2.

Wired interconnect 110 may produce EMI 112, wired interconnect 120 may produce EMI 122, and wired interconnect 130 may produce EMI 132. In general, each and every wired interconnect that carries high-speed data is likely to produce EMI that may effectively lower the capabilities of radio receiver 150 to receive a radio signal 142 from a weak or far away radio transmitter 140.

This problem is very common in many electronic systems, including for example consumer devices such as smartphones, smart TVs, computers, laptops, and tablets. These systems often include multiple radio receivers, as well as multiple partial and full wired interconnects. Some of the current radio systems often affected are WiFi, Bluetooth, GPS, CDMA, LTE, etc. Some popular wired interconnect systems that may cause the problems include serial data systems such as Ethernet, USB, and HDMI; video data buses such as internal and embedded DisplayPort and V-by-One; general memory and data buses for computing such as PCIe, HyperTransport, SAS, and SATA. In some of these cases, data can be bidirectional and each end of the wired interconnect may include both a wired data transmitter and a wired data receiver.

FIG. 2 illustrates a wired interconnect 200 with various locations from which it may radiate energy contained in transmitted data. Transmitter 210 provides a stream of data bits represented as a signal of time-varying voltages and/or currents. This time-varying signal can be translated back to a stream of data bits by receiver 270. To get from transmitter 210 to receiver 270, the signal may be coupled via printed card board (PCB) trace 220 with male/female connector pair 230, cable 240, male/female connector pair 250, and PCB trace 260. The signal could be a single time-varying voltage/current, or it could comprise multiple parallel time-varying voltages/currents. The signal could be single-ended or differential. In respective cases, there could be a single path or multiple parallel paths between transmitter 210 and receiver 270. Due to losses in the EM field, including those that cause EMI, there is potentially a large signal attenuation between transmitter 210 and receiver 270. To provide the receiver 270 with adequate signal, the transmitter 210 may be designed to provide extra energy, worsening EMI. Leak of energy, and hence a cause for EMI, may occur at each of the depicted components 210 through 270. The problem is worst near transmitter 210, PCB trace 220, and connector pair 230, but may persist all the way through receiver 270. Therefore, any part of wired interconnect 200 that may be contained in a system 100 may be cause for EMI concern.

Some wired interconnects do not contain all components depicted in FIG. 2. For instance if the wired interconnect is a memory data bus, block 210 might represent a processor containing both a transmit and receive function, block 270 might represent a memory chip containing both a transmit and receive function, and if the processor 210 and the memory chip 270 are both soldered directly onto a PCB, there may only be PCB traces 220 or 260 in between. Should the memory be part of a memory module, then the memory chip may be soldered onto a different PCB than the processor. In that case, processor 210 would be coupled with connector pair 230 or 250 through PCB traces 220, and memory chip 270 would be coupled with connector pair 230 or 250 through PCB traces 260.

In another example, a notebook computer processor may transmit video data to a display panel. The processor is usually contained in the body of the computer, whereas the display panel is contained in the lid. The processor would hold transmitter 210, which is coupled with a single female connector 230 through PCB wires 220. Cable 240 is a flat cable with wires that are etched from or printed onto a flexible substrate. The cable 240 sticks directly into female connector 230 on one end, and into female connector 250 on the other end. The display panel contains circuitry with receiver 270, which is coupled with connector 250 through PCB traces 260.

Regardless of which components are included in an actual wired interconnect, most or all components may leak energy when high-speed data is passed through, and therefore cause EMI.

Common approaches against EMI include differential signaling and shielded cabling and traces. While useful, the reduction can be limited and still allow significant residual EMI. Placing components far from radio receivers helps too, but can be difficult in systems with small form factors, such as hand-held devices. Radios often use metal shielding and larger antennas and associated cable shielding to protect themselves from EMI. Such solutions may be expensive and only partially effective.

Another problem with uncontrolled radiation of EM energy is that it may be difficult to obtain regulatory approvals, such as from the FCC. Furthermore, there is an unmet need for a method to reduce EMI from a high-speed interconnect without degrading the signal integrity over the interconnect.

Therefore, there is an unmet need for a low-cost method to reduce EM radiation emitted by high-speed wired interconnects.

SUMMARY

In a first aspect, embodiments of the invention provide a method for reducing electromagnetic interference (EMI) in a radio receiver while transmitting high-speed data over a wired interconnect. EMI is reduced in one or more protected frequency bands, i.e. radio frequency receive ranges where reduced interference is desired. High-speed data, with a first energy spectrum is forwarded to a spectral encoder. In the spectral encoder, the high-speed data is spectrally encoded to obtain encoded data with a second energy spectrum, with reduced energy in the protected frequency band(s). The encoded data is transmitted over the wired interconnect.

In embodiments of the invention, spectrally encoding may include modifying statistical properties of the high-speed data; scrambling it; and/or scrambling it with a polynomial. Embodiments may also include selecting an additional protected frequency band and changing the scrambler to reduce energy in the additional protected frequency band. Embodiments may include using an additive or a multiplicative scrambler.

Other embodiments may include encoding the high-speed data multiple times in parallel, using different sets of coding parameters, calculating metrics to determine which encoding result is best, and selecting the best encoding result for transmission through the wired interconnect. A coding identification is added to identify the best result.

In a second aspect, embodiments of the invention provide an encoder/transmitter, including a spectral encoder and a transmit driver coupled with it. The spectral encoder is configured for receiving high-speed data and changing its statistical properties to reduce energy in a protected frequency band. The transmit driver is capable of transmitting the spectrally encoded high-speed data over a wired link.

In an embodiment, the encoder/transmitter may include a parameter memory that can store coding parameters for the spectral encoder. In embodiments, the encoder/transmitter may comprise a computer-readable memory with instructions for a digital signal processor to perform the spectral encoding. In other embodiments, the encoder/transmitter may comprise a computer-readable memory with instructions for configuring a field-programmable gate array to perform the spectral encoding.

In a third aspect, embodiments of the invention provide a receiver/decoder, including a receive buffer and a spectral decoder coupled with it. The receive buffer is capable of receiving spectrally encoded high-speed data from a wired link. The spectral decoder is configured for spectrally decoding the received data, of which properties had been changed to reduce energy in a protected frequency band.

In an embodiment, the receiver/decoder may include a parameter memory that can store coding parameters for the spectral decoder. In embodiments, the receiver/decoder may comprise a computer-readable memory with instructions for a digital signal processor to perform the spectral decoding. In other embodiments, the receiver/decoder may comprise a computer-readable memory with instructions for configuring a field-programmable gate array to perform the spectral decoding.

A further understanding of the nature and the advantages of particular embodiments disclosed herein may be realized by reference of the remaining portions of the specification and the attached drawings.

BRIEF DESCRIPTION OF THE DRAWINGS

The invention will be described with reference to the drawings, in which.

DETAILED DESCRIPTION

A broad array of electronic systems comprise both a high-speed wired interconnect and a wireless radio receiver. A wired interconnect carrying high-speed data has the undesired effect of radiating part of its electromagnetic energy, which may result in loss of data fidelity in the wired interconnect on the one hand, and in interference with a radio receive signal on the other hand. The spectrum of interference may be broad, whereas radio receive signals are often in a relatively narrow radio frequency range. Embodiments of the invention modify the spectrum of the radiated energy to reduce interference in a desired radio frequency range and thus create a protected frequency band.

Figure 1:
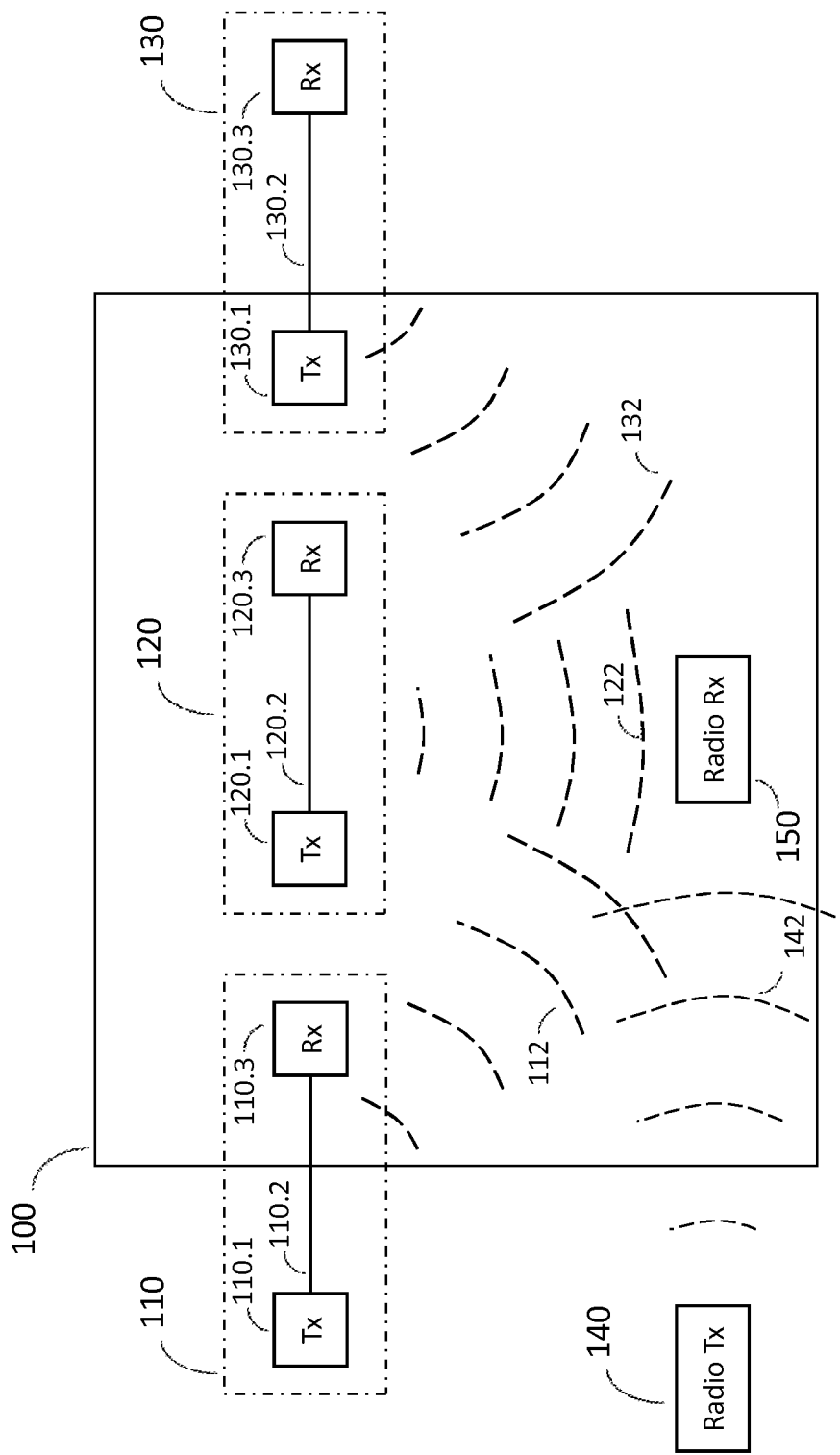
FIG. 1 illustrates a conventional system with a radio receiver receiving interference radiated from one or more full or partial wired interconnects.
Figure 2:
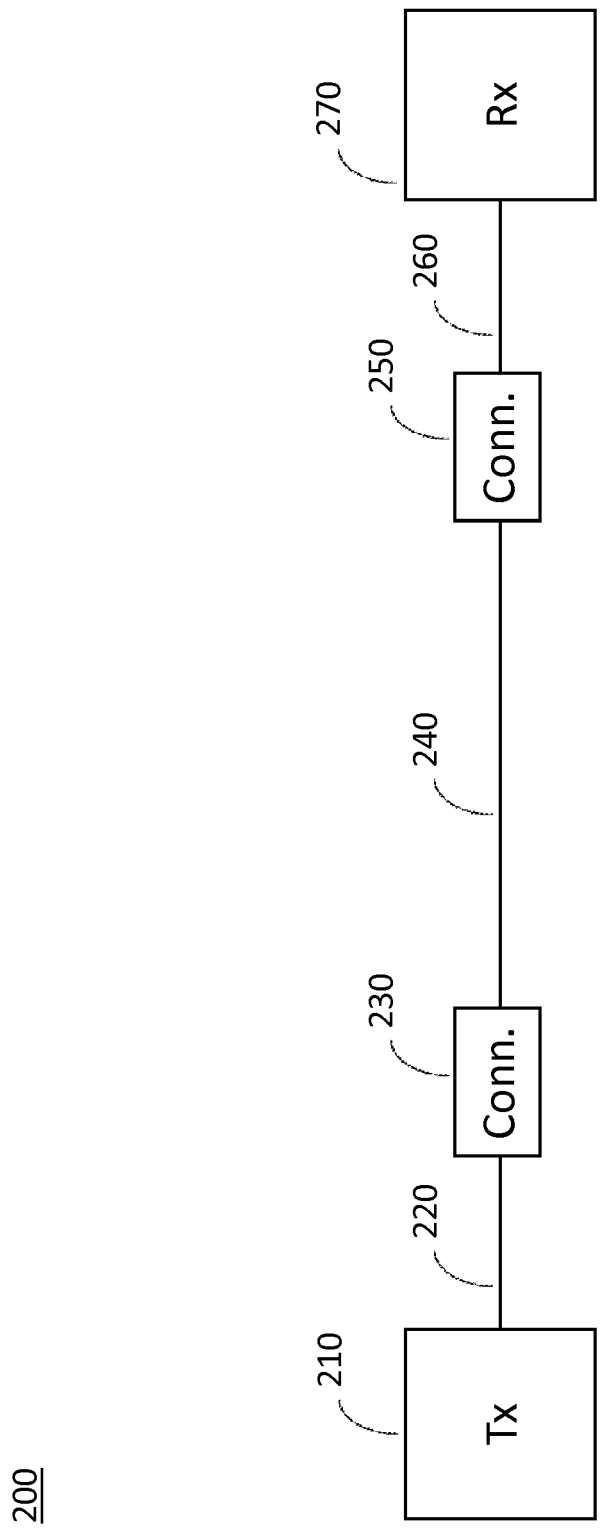
FIG. 2 illustrates a wired interconnect with various locations from which it may radiate energy contained in transmitted data.
Figure 3:
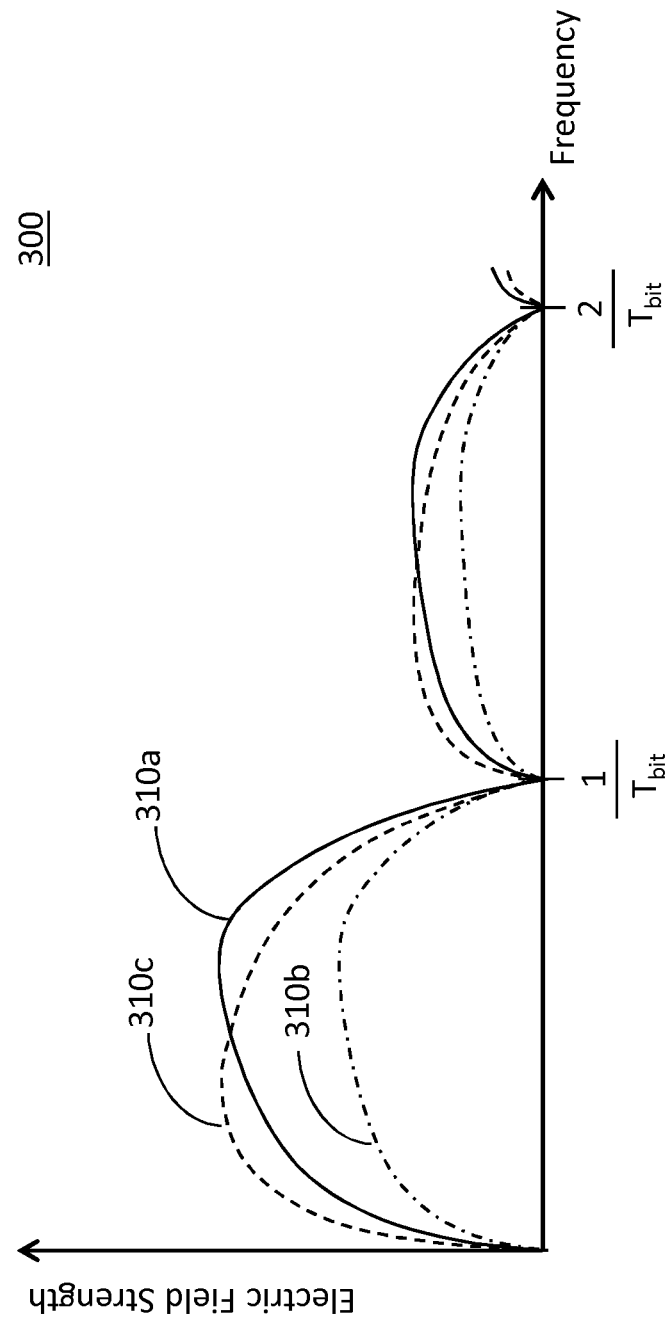
FIG. 3 illustrates three example spectra of energy radiated by a component of a wired interconnect.

FIG. 3 illustrates three example spectra of energy radiated by a component of a wired interconnect. Diagram 300 plots the electric field strength as a function of the frequency. If the wired interconnect carries a high-speed digital signal with a bit period of $T_{bit}$, then the baud rate could be $1/T_{bit}$. The shape of the spectrum of the radiated field depends on the statistical properties of the underlying data transmitted across the wired interconnect. For instance, data encoding often provides for a high number of 0-to-1 and 1-to-0 transitions in order to facilitate clock recovery in a receiver; therefore the spectrum of the EM field could resemble spectrum 310a (depicted with a solid line), which has its highest energy content in frequencies not far below the baud rate. The spectrum dips at the baud rate, and is repeated at a lower strength for frequencies above the baud rate, representing harmonics of the digital signal.

In a another example, clock recovery in a receiver may need to be facilitated, but the physical distance may not be large. In that case, while the signal may need to look statistically the same, the energy level (amplitude) may be reduced, resulting in the spectrum 310b—depicted with a dash-dotted line.

In a third example, when clock recovery is more robust or signal integrity is better, the number of signal transitions may be kept low and not as much high-frequency energy is needed. In such a case, a resulting spectrum 310c (dashed line) may be more balanced, or more rounded.

A key characteristic of spectra 310a-c is that they are broadband, i.e. their energy is spread across a wide range of frequencies. Consequently, they can interfere with a great number of radio bands. For instance, an interconnect application such as PCI Express may utilize a baud rate of 8-Gbps and a bit period $T_{bit}$ of 125-ps. This could impact a wide variety of radio service bands near 5-GHz and below, including common radio frequency bands used in consumer electronics systems and devices.

Figure 4:
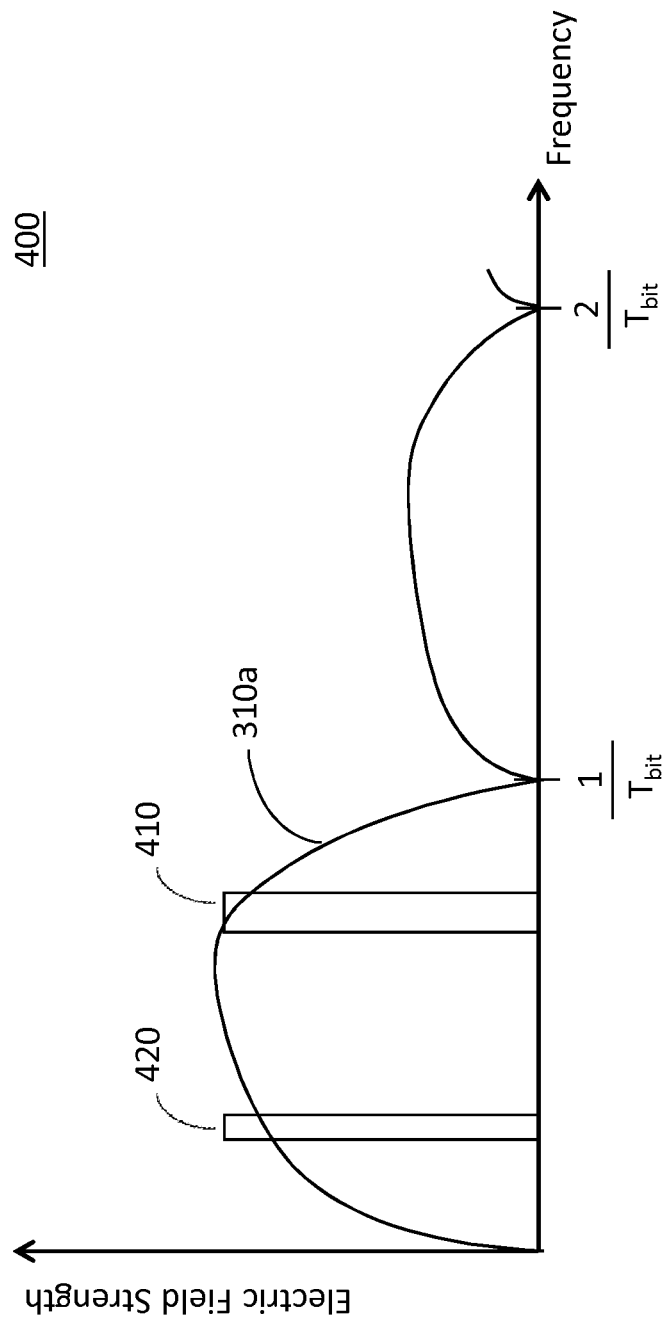
FIG. 4 illustrates two radio frequency receive signals in the presence of energy radiated by data in a wired interconnect.

FIG. 4 illustrates example two radio frequency receive signals in the presence of energy radiated by data in a wired interconnect. Diagram 400 repeats the example spectrum 310a discussed above. In this example, a first radio signal 410 has a first radio frequency range and a second radio signal 420 has in a second radio frequency range. As shown in FIG. 4, the magnitude of the EMI 310a in frequency band of the first radio signal is nearly the same as the magnitude of the first radio signal 410. As a result, the reception of radio signal 410 will be heavily compromised by the interference from EMI 310a. The second radio signal 420 has a slightly larger magnitude than EMI 310a in its frequency band, so interference may be less than with the first radio signal 410. However, if there are stringent requirements for a low bit-error rate in the received second radio signal, the interference could still be too high.

Figure 5:
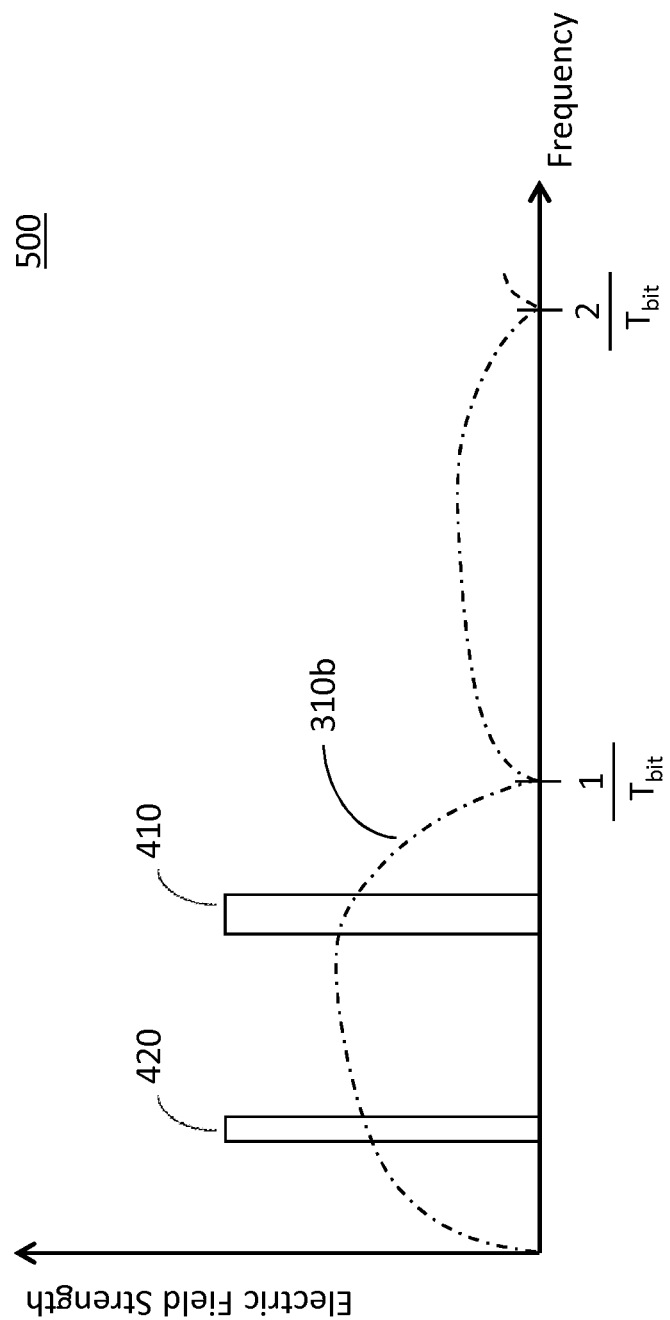
FIG. 5 illustrates an aspect of the invention in which interference is reduced by lowering the amplitude of the radiated energy.

FIG. 5 illustrates an aspect of the invention in which interference is reduced by lowering the amplitude of the radiated energy. Diagram 500 shows the first and second radio signals 410 and 420 in the presence of an interfering EM field with spectrum 310b. The signal-to-interference ratio has much improved and reception of the signals will be much less compromised. This solution is available when the distance of the wired interconnect is short, and not much of the energy would be lost in the form of radiation. Buffering makes this solution also available in case of longer interconnects, as will be shown in the following.

Figure 6:
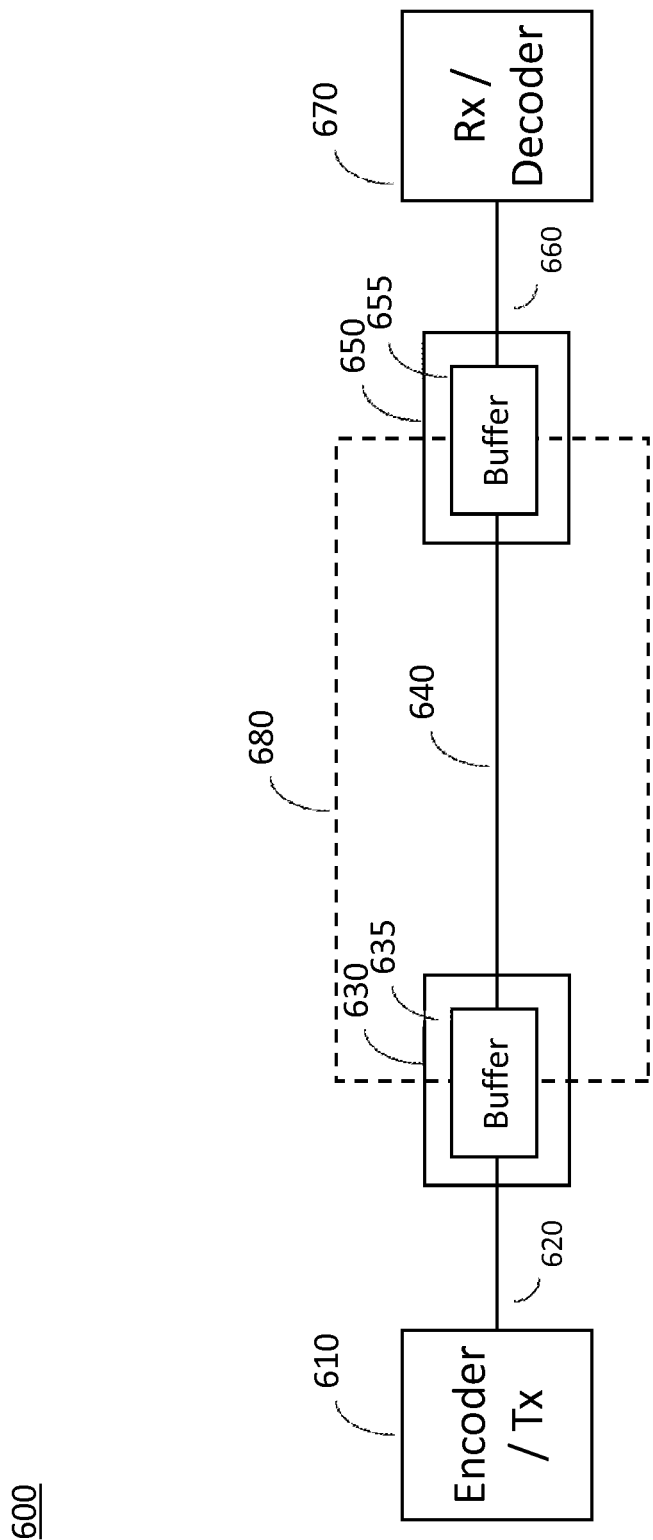
FIG. 6 illustrates the use of buffering to compensate for transmitting data at a reduced amplitude according to an embodiment of the invention.

FIG. 6 illustrates the use of buffering to compensate for transmitting data at a reduced amplitude according to an embodiment of the invention. Wired interconnect 600 comprises encoder/transmitter 610, PCB trace 620, male/female connector pair 630, cable 640, male/female connector pair 650, PCB trace 660, and receiver/decoder 670. Cable assembly 680 includes cable 640, one half of the connector pair 630, and one half of the connector pair 650.

The encoder/transmitter 610 transmits its data at a reduced amplitude, to obtain the EMI advantage that was illustrated in FIG. 5. The connector pair 630 contains a first buffer circuit 635, amplifying the data signal before it enters the cable 640. Optionally, the connector pair 650 may contain a second buffer 655, amplifying the data signal again. The first buffer 635 could be located either in a transmit-system-side connector assembly of connector pair 630, or in a cable-side connector assembly of connector pair 630. Similarly, the second buffer 655 could be located in a cable-side connector assembly of connector pair 650, or in a receive-system-side connector assembly of connector pair 650. Additional buffers may be placed elsewhere on the signal path, for instance cable 640 could be split in multiple segments each coupled by a buffer.

By using one or more buffers in the wired interconnect 600, the signal levels can be kept at sufficiently high energy levels to enable proper reception at decoder/receiver 670, yet at sufficiently low energy levels to reduce EMI, especially at the transmit side of the wired interconnect.

For example, in the embodiment illustrated in FIG. 6, the encoder/transmitter 610 and buffers 635, 655 may need to only drive a small amplitude such as 200-mV$_{ppd}$ or smaller, rather than 600-1200-mV$_{ppd}$ if no buffers were provided. If buffers 635 and 655 are both located in cable-side connector assemblies, cable assembly 680 would become an active cable assembly, providing long-range connection capability between a transmitter system and a receiver system that with a passive cable assembly may only have short-range connection capability, while maintaining low levels of EMI. Alternatively, if just a buffer 635 is used, located in a transmit-system-side connector assembly of connector pair 630, then the invention provides compatibility with standard signal levels while lowering EMI in the transmit system.

Figure 7:
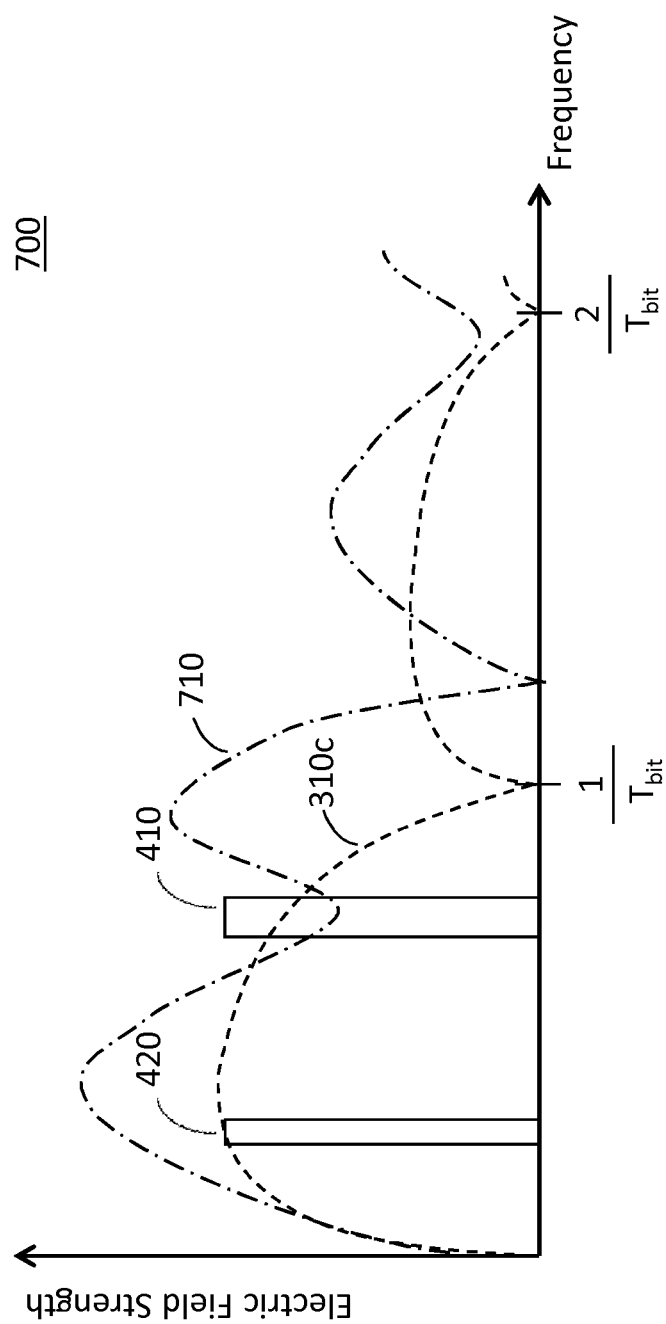
FIG. 7 illustrates an aspect of the invention in which interference is reduced by modifying the statistical properties of the radiated energy.

FIG. 7 illustrates an aspect of the invention in which interference is reduced by modifying the statistical and/or spectral properties of the radiated energy. Diagram 700 shows the first and second radio signals 410 and 420 in the presence of an interfering EM field with spectrum 310c. Compared to FIG. 4, where the first radio signal 410 had a very poor signal-to-interference ratio, and the situation was better for the second radio signal 420, the roles are now reversed. As mentioned before, the interference spectrum 310a may have been the result of increasing the number of transitions in order to facilitate clock recovery, resulting in the situation of FIG. 4, whereas interference spectrum 310c may have been the result of maximizing the coding efficiency. Hence, the different statistical properties of the transmitted data may help in a first frequency range, and worsen interference in a second frequency range.

Embodiments of the invention provide further improvement of EMI conditions for the first radio signal 410 (or for the second radio signal 420, or even for both). Random or pseudo-random scrambling can be used to redistribute the data and disperse the energy in its spectrum, or in other words, make it look more noisy. Just like white noise and pink noise can be equally random while having very different energy spectra, different ways of scrambling can be used for differently shaping the data's energy spectrum. More generally, different ways of coding data can be used for shaping the data's energy spectrum, and creating one or more protected frequency bands.

For instance, embodiments of the invention may use a polynomial scrambler as a spectral encoder, scrambling the data bits to be transmitted in a manner that the signal spectrum around the radio frequency band of interest is reduced. The choice of polynomial factors determines the shape of the spectrum. Significant improvement in the radio frequency band of interest can be obtained, although EM radiation may get worse in other radio frequency bands.

Embodiments of polynomial spectral encoders and decoders utilize a polynomial in the general shape of $1+a_1x^{-1}+a_2x^{-2}+\ldots+a_nx^{-n}$, wherein the coefficients $a_1 \ldots a_n$ can each only take a value of 0 or 1. Embodiments of the invention may use two types of polynomial scramblers: [1] additive scramblers, also called synchronous scramblers; and [2] multiplicative scramblers, also called self-synchronous scramblers. Further embodiments of the invention may use spectral coding methods other than polynomial scrambling to obtain the same effects. For instance, block, algebraic, or convolutional codes may be used. Still further embodiments of the invention may include error detection and/or error correction in addition to the spectral coding.

Once the data is scrambled or coded as required, it may traverse the path toward the receiver without doing much damage to a received wireless radio signal. Scrambling or decoding is undone by a spectral decoder that may comprise, for instance, a polynomial descrambler matched to invert polynomial scrambling provided in the encoder. The decoded received data is digitally equivalent to the data input to the transmitter.

In some embodiments of the invention, the spectral encoder and transmitter may be combined to minimize the leak of harmful spectra. The receiver and spectral decoder may be combined for the same reason.

Figure 8:
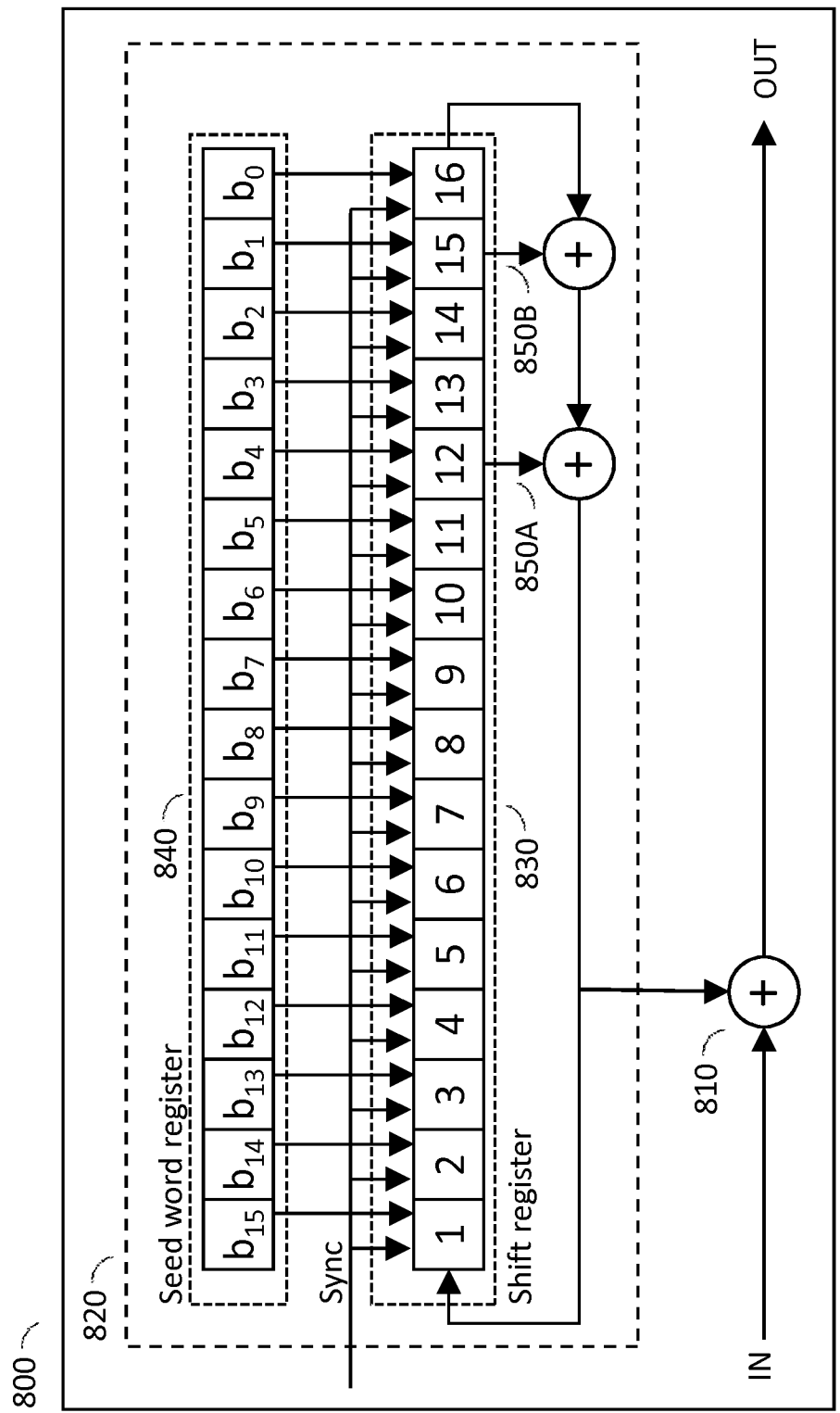
FIG. 8 illustrates a conventional additive polynomial scrambler/descrambler.

FIG. 8 illustrates a conventional additive polynomial scrambler/descrambler 800. The circuit 800 can be used to scramble a data signal at its input IN to obtain a scrambled data signal at its output OUT, and to descramble a scrambled data signal at its input IN to obtain a descrambled data signal at its output OUT. The descrambled data signal will be logically identical to the original data signal, provided that: [1] the scrambler and descrambler use the same polynomial; [2] they use the same seed word and are initialized (synchronized) at the same time; and [3] the scrambled data contains no bit errors—it has been transmitted and received flawlessly.

Additive scrambler/descrambler 800 uses modulo-2 adder 810 (such as an XOR gate) to add a coding bit sequence to the data bit sequence. The result is a coded bit sequence. If the same coding bit sequence is subsequently added to the coded bit sequence, the original data sequence is recovered. The coding bit sequence could be deterministic or pseudo-random. One embodiment of the scrambler/descrambler 800 includes polynomial pseudo-random sequence generator 820 to produce the coding bit sequence for modulo-2 adder 810.

The pseudo-random generator 820 includes shift register 830, which in the example of FIG. 8 is sixteen delay stages deep. Shift register 820 can be initialized by a seed word $b_{15}$-$b_0$, stored in seed word register 840, by applying a synchronization signal at the collective sync inputs of the delay stages. The shift register 820 is contained in a feedback loop, where taps on one or more of the delay stages, such as taps 850A and 850B, provide signals that are added by modulo-2 adders to the feedback signal. This operation can be described with a polynomial. The number of shift register cells equals the number of terms of the polynomial it implements. The taps on the shift register cells determine the polynomial coefficients. The polynomial illustrated in FIG. 8 is $1+x^{-12}+x^{-15}+x^{-16}$, since all coefficients other than $a_{12}$, $a_{15}$, and $a_{16}$ are zero.

If one bit error occurs in a scrambled signal sequence from an additive scrambler, then the descrambled signal will have one bit error, too. However, additive scrambling can result in massive data loss if synchronization is lost.

Figure 9:
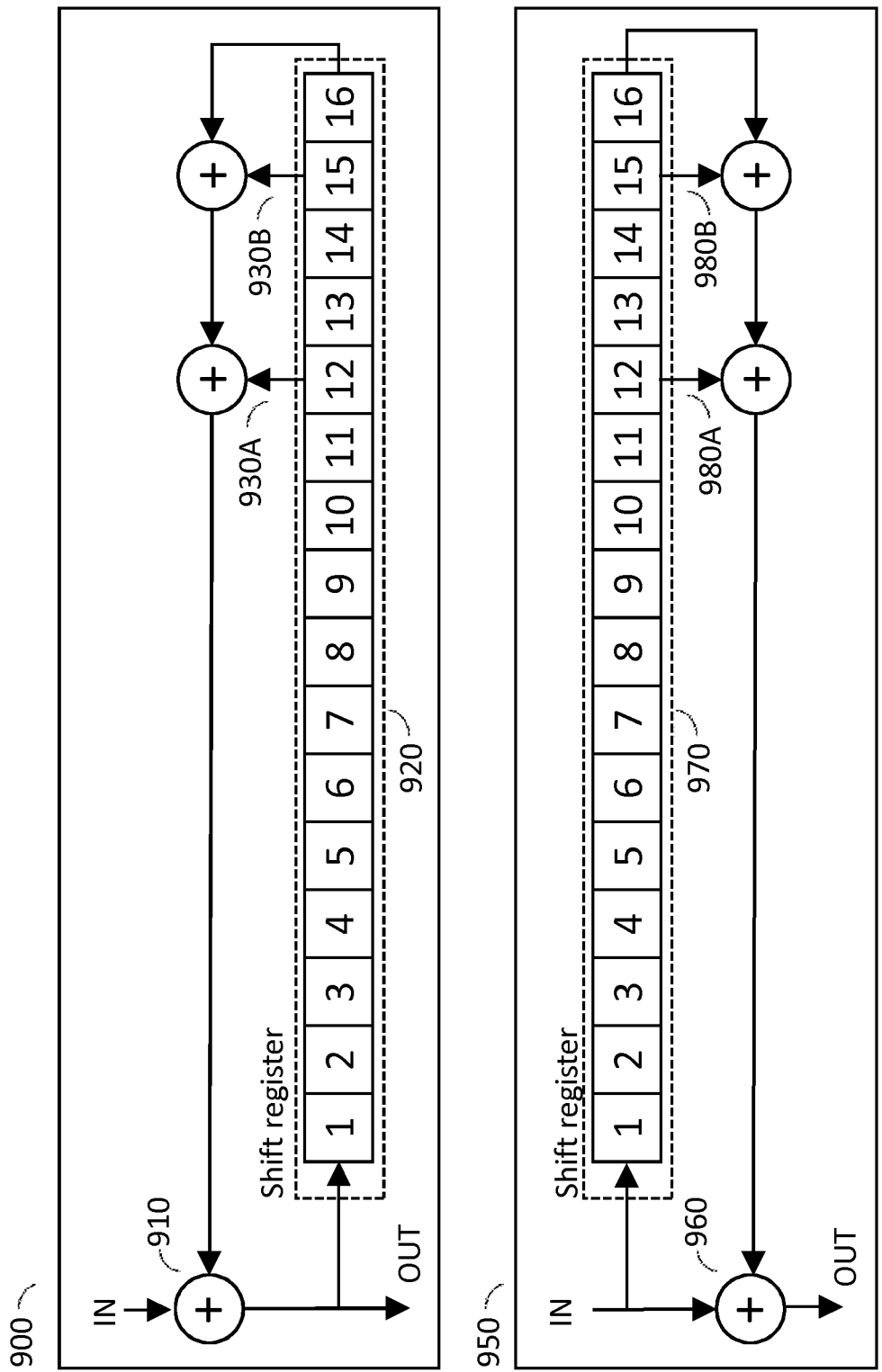
FIG. 9 illustrates both a conventional multiplicative polynomial scrambler and a multiplicative polynomial descrambler.

FIG. 9 illustrates both a feedback multiplicative polynomial scrambler 900 and a feed-forward multiplicative polynomial descrambler 950. Feedback multiplicative scrambler 900 contains a feedback loop and therefore it is recursive. Feedback multiplicative scrambler 900 uses modulo-2 adder 910 in its data path. Instead of adding an independent pseudo-random sequence to the bit signal sequence at input IN, the sequence added is based on delayed versions of the adder's own output signal at output OUT. The output signal enters shift register 920. Additionally, the feedback path optionally includes one or more taps, such as taps 930A and 930B, that are added to the shift register output in the feedback path. The length of the shift register and the number and location of its taps, if any, on the feedback path determine the polynomial order and coefficients. No seed word is needed as the data itself determines the result.

Feed-forward multiplicative descrambler 950 contains only forward paths, and therefore it is non-recursive. The data sequence at input IN is provided to modulo-2 adder 960 and shift register 970. The output of the shift register is fed forward and coupled with the second input of modulo-2 adder 960. Additionally, the feed-forward path optionally includes one or more taps, such as taps 980A and 980B, that are added to the shift register output in the feed-forward path.

Unlike feedback multiplicative scramblers, feed-forward multiplicative scrambling is self-synchronous and therefore does not doesn't have synchronization problems if there is a bit error.

Figure 10:
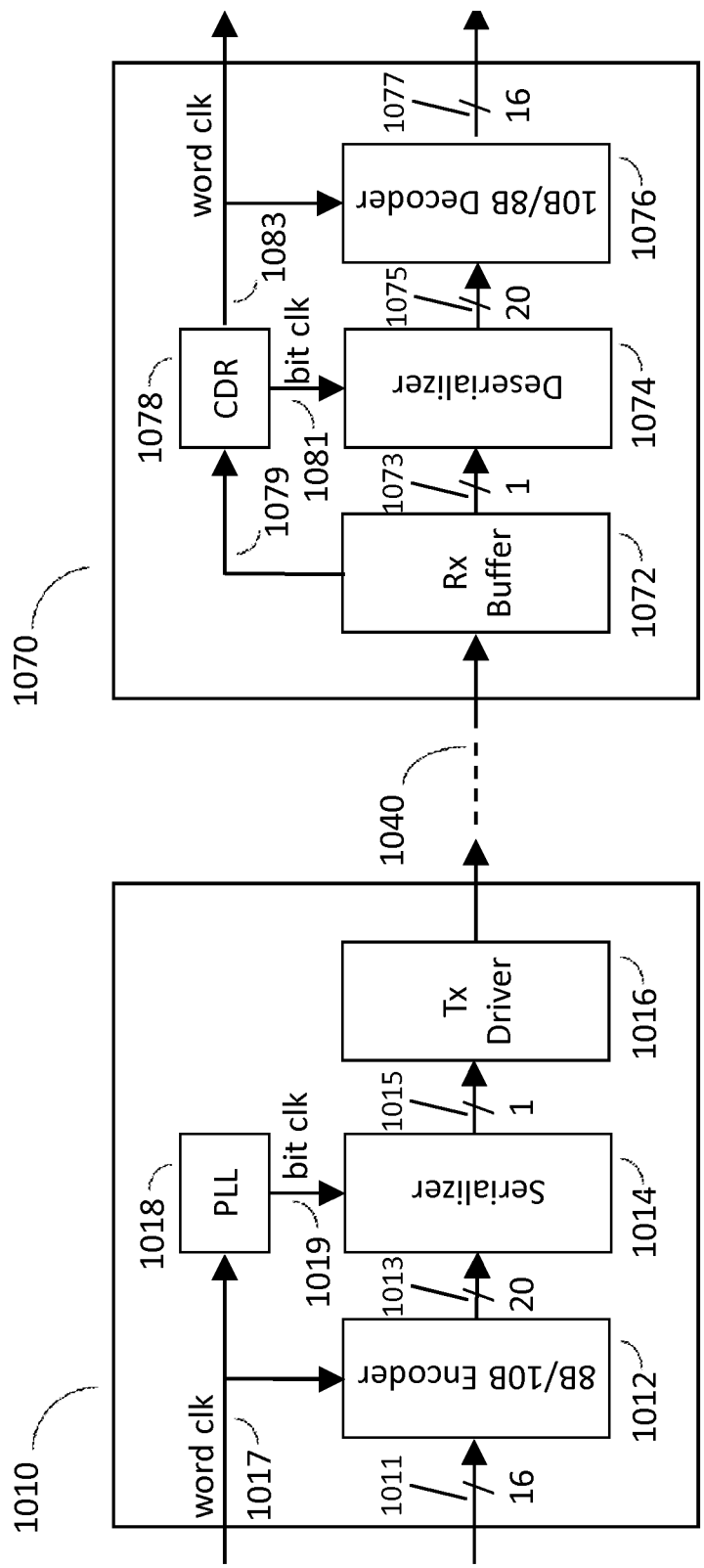
FIG. 10 illustrates a conventional wired interconnect with serialized data.

FIG. 10 illustrates a conventional wired interconnect with serialized data. Wired transmitter 1010 is coupled with wired receiver 1070 via wired link, or cable, 1040. In this example, wired transmitter 1010 comprises an 8B/10B encoder 1012 to balance the number of 1s and 0s in the signal, eliminating DC bias in the signal. It does so by taking an input signal 1011, which is for instance 16 bits wide, and padding each 8 bits with an additional 2 bits, therefore producing an output signal 1013 that is 20 bits wide from a 16 bit input signal. Serializer 1014 converts this signal to 20 serial bits at a bit clock rate that is (at least) 20 times the word clock rate. The serialized signal 1015 is provided to transmit driver 1016, which outputs it as a single-ended or differential signal of appropriate voltage and current levels (hence energy levels) with wired link 1040.

The input data signal 1011 is clocked by word clock 1017, which is also used for 8B/10B encoder 1012. Bit clock 1019 may be generated by PLL 1018 from word clock 1017.

Wired receiver 1070 comprises receive buffer 1072 coupled with wired link 1040 to receive the serialized data signal. The receive buffer 1072 may amplify the signal as needed to compensate for energy losses sustained in the link. It may also convert the signal from differential to single-ended, as needed. The receive buffer drives deserializer 1074 and clock and data recovery (CDR) unit 1078. The signal 1073 driving deserializer 1074 may be separate from signal 1079 provided to the CDR by receive buffer 1072, or both signals may be the same. In that case CDR 1078 and deserializer 1074 may both be coupled with the same output of the receive buffer 1072. In some cases, CDR 1078 may be located in between receive buffer 1072 and deserializer 1074, where CDR 1078 provides an input signal for deserializer 1074. CDR 1078 provides both bit clock 1081 and word clock 1083.

Output signal 1075 of the deserializer, in this example, is 20 bits wide, and provided to 10B/8B decoder 1076 to provide 16 bits wide output signal 1077.

Figure 11:
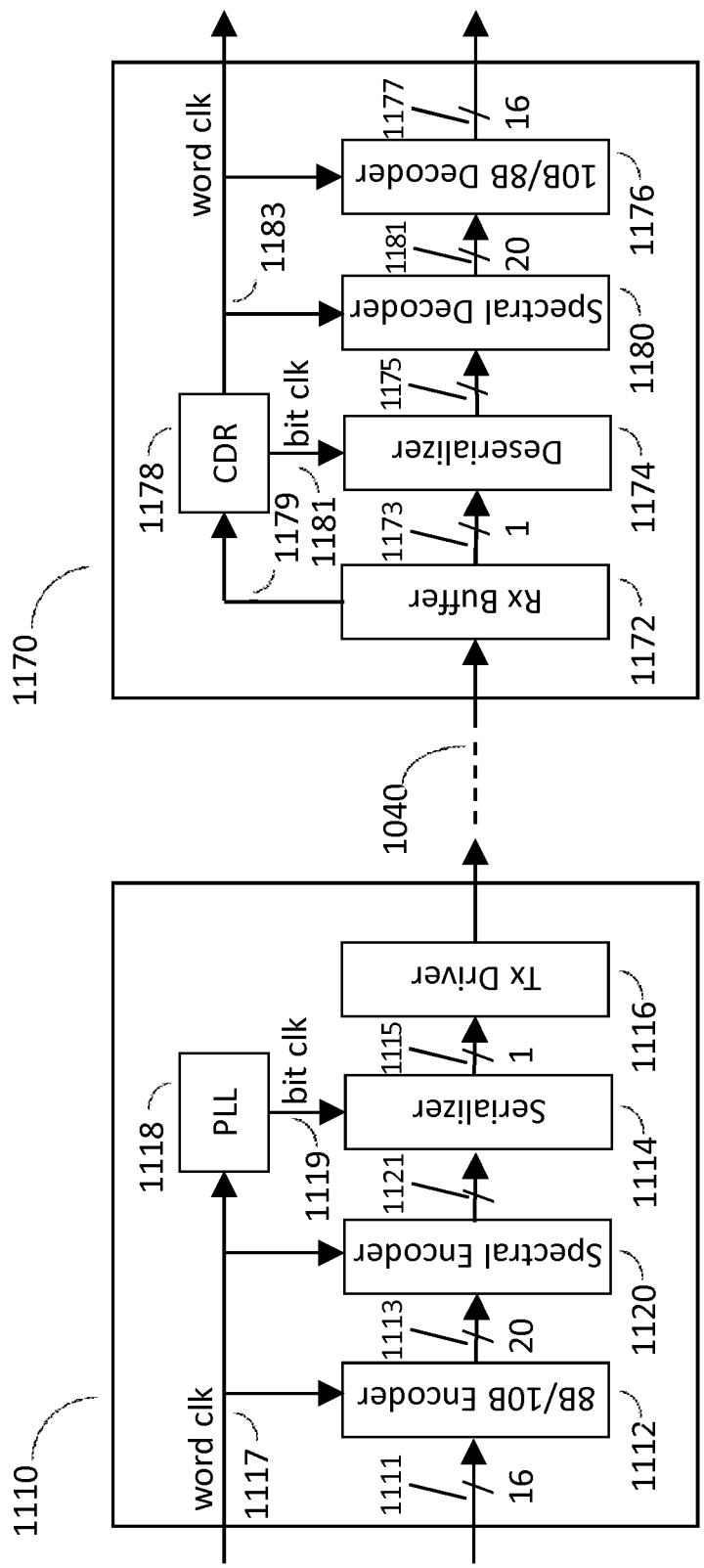
FIG. 11 illustrates an embodiment of the invention where the statistical properties of the radiated energy is reduced in a wired interconnect with serialized data.

FIG. 11 illustrates an embodiment of the invention that reduces EMI by modifying the spectral properties of the radiated energy from a wired interconnect with serialized data. Wired transmitter 1110 is similar to transmitter 1010 in FIG. 10, including a 8B/10B encoder 1112, serializer 1114, wired transmitter signal driver 1116, word clock 1117, and PLL 1118. Additionally, transmitter 1110 also comprises spectral encoder 1120, operating, for instance, at the rate of the word clock 1117 on input signal 1113 to produce signal 1121 whose spectrum is shaped in order to reduce harmful EMI.

In an embodiment, the output signal 1113 from 8B/10B encoder 1112 is coupled with the input of spectral encoder 1120 and the output signal of spectral encoder 1121, which has a spectrum shaped to reduce unwanted EMI, is coupled with the input of serializer 1114.

In another embodiment of the invention, spectral encoder 1120 may receive the output of serializer 1114 and provide a spectrally shaped data signal to transmit driver 1116. The shape of the resulting spectrum in such an embodiment is unaffected. One advantage of this architecture may be that additive and multiplicative scramblers are usually implemented as circuits acting on bit streams rather than on word streams.

In yet another embodiment of the invention, spectral encoder 1120 may receive input signal 1111 and provide a spectrally shaped data signal to 8B/10B encoder 1112. In that case, the spectrum of the data signal ultimately output from TX driver 1116 may be different than that from the spectral encoder 1120, as the 8B/10B encoder itself affects the energy spectrum of the signal.

And in yet another embodiment of the invention, an encoding scheme other than 8B/10B may be used, including using no encoding at all. This may be done in applications where removing DC bias can be more efficiently performed by the spectral encoder or DC bias is not a concern.

Receiver 1170 is similar to receiver 1070 in FIG. 10, and includes a wired receiver buffer 1172, deserializer 1174, 10B/8B decoder 1176, CDR 1178, bit clock 1181, and word clock 1183. Additionally, an embodiment of receiver 1170 also comprises spectral decoder 1180, operating, for instance at the word clock 1183 on input signal 1173 to produce signal 1181 coupled into 10B/8B decoder 1176. In an embodiment, the receiver 1170 output signal 1177 is digitally identical to transmitter 1110 input signal 1111, provided that no bit errors occur during transmission over wired link 1040.

In another embodiment of the invention, spectral decoder 1180 may receive signal 1173 and provide a spectrally-decoded output signal to deserializer 1074. And in yet other embodiments, in line with the architecture used in the transmitter, spectral decoder 1180 and 10B/8B decoder 1176 may be swapped, or 10B/8B decoder 1176 may be left out altogether, or may be substituted with a decoder that inverts the encoding done by encoder 1112 in transmitter 1110.

Architectural variations may be used for the transmit and receive architecture in FIG. 11 without loss of the inventive value herein. Further embodiments of the invention may use data word widths different than 16 bits. Or, instead of 8B/10B encoding and 10B/8B decoding, embodiments can use 64B/66B or other schemes. Data may be coded with redundant bits to facilitate error detection and correction. Instead of a cable with one single-ended or differential wire pair, multiple such channels may be used.

Figure 12A:
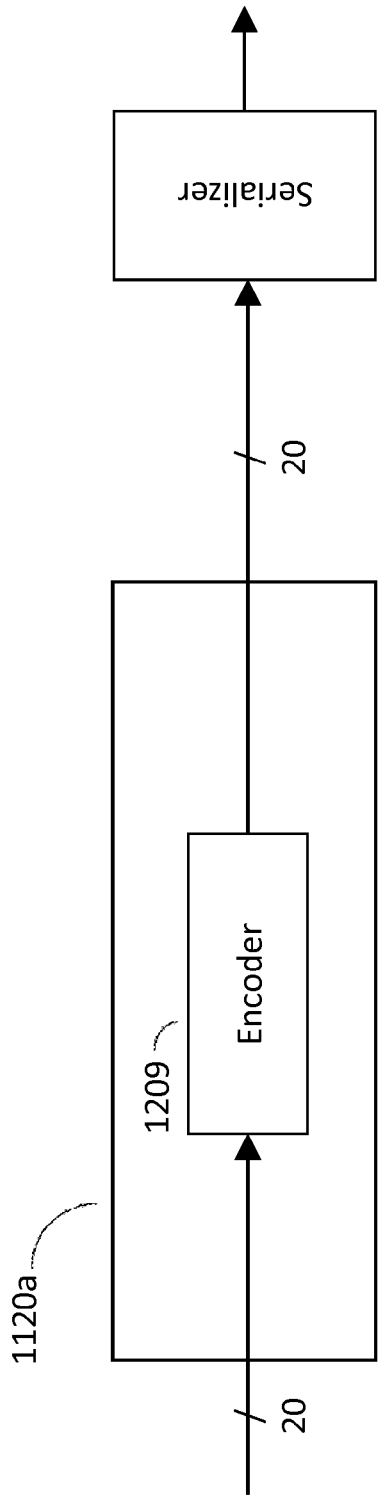
FIGS. 12A-B illustrate example spectral encoders according to embodiments of the invention.
Figure 12B:
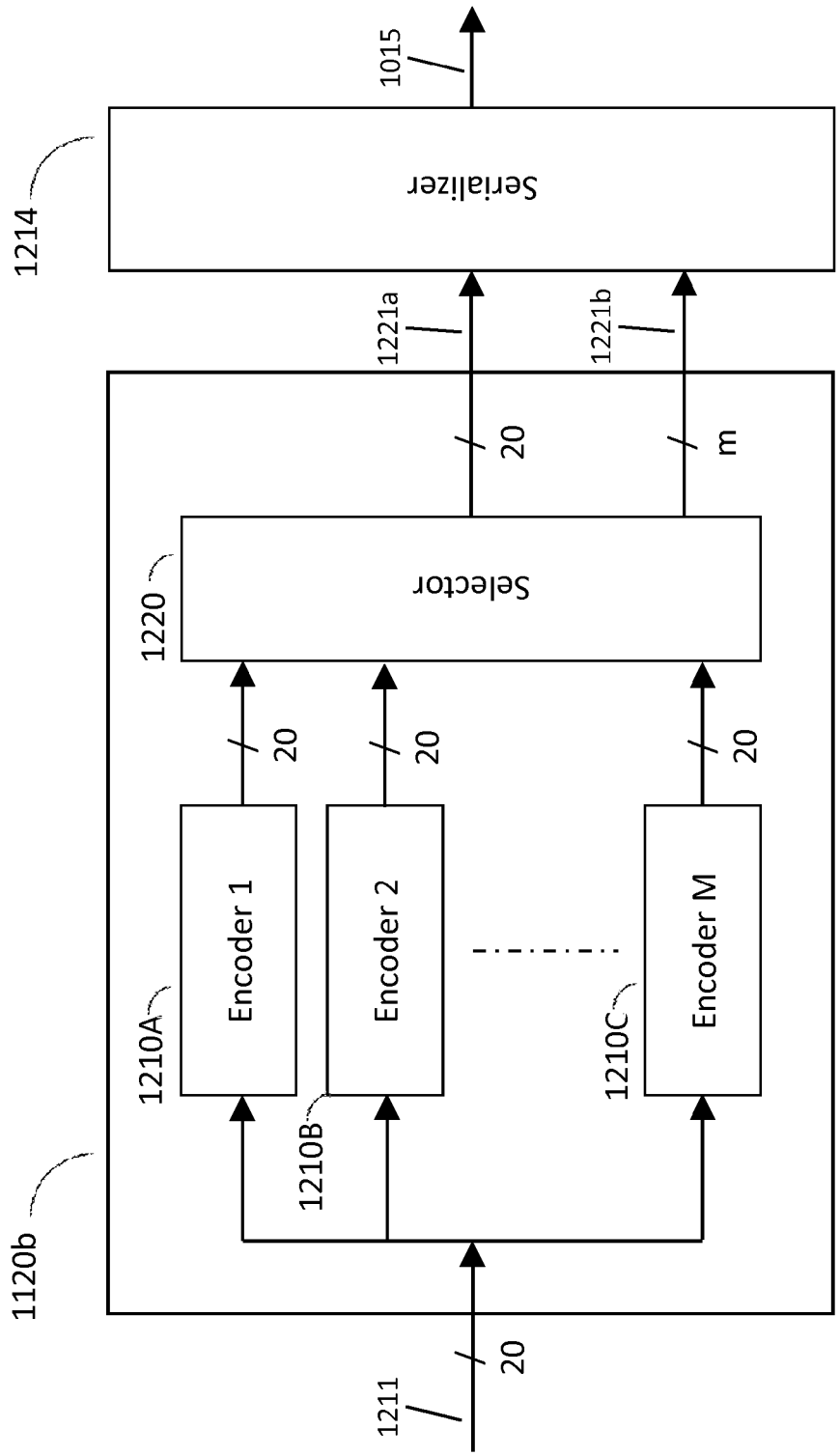

FIGS. 12A-12B illustrate example implementations of spectral encoder 1120 according to embodiments of the invention. FIG. 12A shows a first embodiment of the spectral encoder 1120a comprising a single encoder 1209. Spectral encoder 1209 may include additive, multiplicative, or other types of polynomial scramblers or encoders, or a coder according to any other scheme that modifies the spectral content of the data while preserving the informational content.

FIG. 12B shows a second embodiment of spectral encoder 1120b. Spectral encoder 1120b comprises M parallel encoders, such as encoders 1210A, 1210B, and 1210C, where M is any arbitrary positive integer. In an embodiment, each of the M encoders encodes the input data 1211 differently. For example, with polynomial scrambling, each of the M encoders may use a different polynomial, seed word, or other coding parameter(s) to scramble or encode the input data signal 1211 into a different spectrally encoded output.

Selector block 1220 identifies which of the M encoders' output signals provides the least interference with one or more protected frequency bands, for a given portion or data sequence of the input signal 1211. In an embodiment, selector 1220 computes a metric value for each of the outputs of the M encoders to determine which scrambler 1210 yields the lowest energy content in the protected frequency band for a given data block or data word. Each encoder's metric value may include a sum, average, weighted average, moment, or other function of the spectral energy content of its output signal in one or more protected frequency bands. Embodiments of selector block 1220 may calculate the spectral energy content used to compute metrics for the M encoders 1210 by computing the fast Fourier transform (FFT), using one or more digital filters, or any other frequency or spectrum evaluation technique known in the art.

Selector block 1220 then forwards the output signal with the best metric with respect to the protected frequency bands to serializer 1214. Because different portions of the input signal 1211 may be encoded using different encoders, spectral encoder 1120b also needs to communicate to the receiver which of the parallel encoders was selected. If there are M scramblers, then it takes m bits for coding identification, where m=ceil($\log_2$ M) and ceil( ) rounds up. For example, if there are 16 scramblers 1210, then m=4 bits. Therefore, if the input signal 1211 is, for instance, 20 bits wide, then the output signal of spectral encoder 1120b needs to be at least 20 bits (1221a) plus m bits (1221b) wide. The width m of the coding identification may be reduced below $\log_2$ M if spectral optimization is performed over multiple data words rather than for each individual data word.

Embodiments of the invention may add other bits without deviating from the scope of the invention. These could include, for example, parity check bits for error detection and correction, synchronization markers for frame alignment, inversion indicators if a word is to be inverted for purposes of maintaining DC balance, etc.

In an embodiment, the encoders 1210A-C may include additive scramblers. In that case, a need for frame alignment between spectral encoder 1120 and spectral decoder 1180 exists. The M encoders/scramblers may differ from each other in polynomial and/or in seed words. In one implementation, the multiple parallel encoders may utilize a single polynomial, with M different seed words, as then the scrambler hardware could collapse to a single scrambler coupled to a table containing the M seed words. Alternatively, using different polynomials in some or all of the encoders/scramblers may have more impact on the spectral shape and thus may yield reduced EMI.

In another embodiment, the encoders 1210 could be multiplicative scramblers. In this embodiment, there is no need for frame alignment between spectral encoder 1120 and spectral decoder 1180 or for seed words, as described above. In this embodiment, the M parallel encoders/scramblers 1210 could differ in polynomial, and/or initial seed.

As discussed above, embodiments may place serializer 1014 in front of spectral encoder 1120 rather than behind it. In those embodiments, the input signal for spectral encoder 1120b is one bit wide, and the data provided to and output by selector block 1220 is one bit wide. Since at least m bits are added for coding identification, the selector block 1220 output signal 1121 may need to be clocked at a slightly higher rate than the input signal 1011 to account for the extra bits in the serial stream. Alternatively, serializer 1014 may already run at this higher clock, and pad the data with at least m dummy bits that the M scramblers 1210 may replace with their individual coding identification.

Figure 13A:
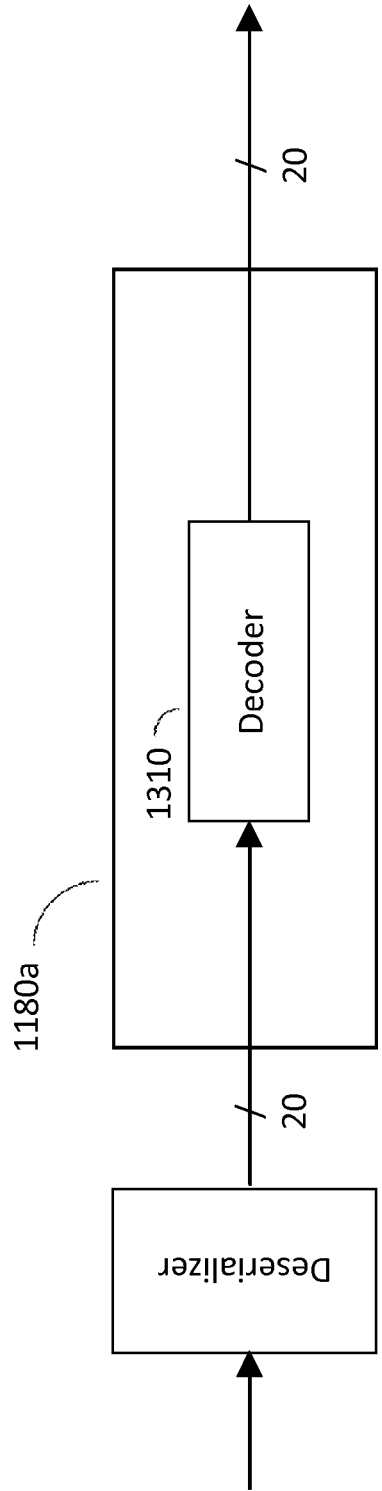
FIGS. 13A-B illustrate example spectral decoders according to embodiments of the invention.
Figure 13B:
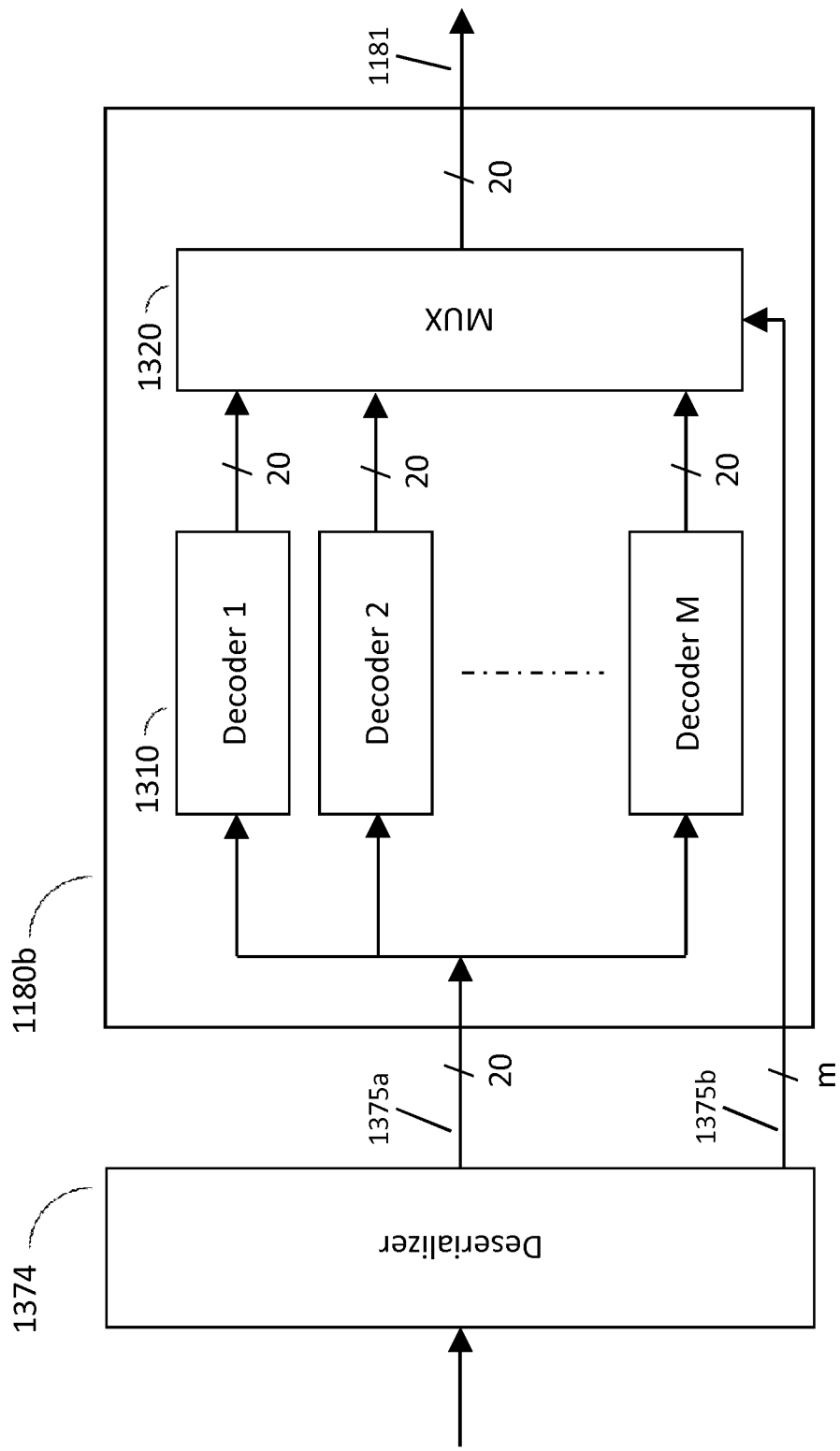

FIGS. 13A-B illustrate example spectral decoders 1180 according to embodiments of the invention. FIG. 13A shows a first embodiment of a spectral decoder 1180a comprising a single decoder 1310, which may be an additive or multiplicative descrambler, or a decoder according to any other scheme that modifies the spectral content of the data while preserving the informational content.

FIG. 13B shows an enhanced embodiment, in which the spectral decoder 1180b comprises M parallel decoders 1310. This architecture complements the spectral encoder 1120b and is capable of decoding its on-the-fly optimized data. Its input signal comprises deserialized data on input 1375a and m bits wide deserialized coding identification on input 1375b. Each of the M decoder 1310 decodes the input data 1375a with polynomial, coefficients, seed word, or other coding parameter(s) matching those of encoders 1210 of FIG. 12B. Multiplexer 1320 selects the correct decoder output word as determined by the m bits coding identification from input 135b.

If additive scramblers were used for spectral encoding, then the descramblers 1310 include additive descramblers. The polynomials, coefficients and seed words for descramblers 1310 must be identical to those of scramblers 1010, and there is a need for frame alignment between the scrambler 1120b and the descrambler 1180b. Any frame alignment bits added to the serial data must be detected before spectral decoder 1180, and their detection is used to trigger loading the seed words in the shift registers of the respective descramblers 1310.

If multiplicative scramblers were used for spectral encoding, then the descramblers 1310 include multiplicative descramblers. The polynomials and coefficients for descramblers 1310 must be identical to those of scramblers 1210. However, there are no seed words and there is no need for frame alignment as the data is self-synchronized.

Embodiments may comprise several variations of the architecture illustrated in FIG. 13B. For example, since only one decoder 1310 needs to be active at a time, the code identification could be used to activate only that particular decoder. In that case, if the decoders 1310 have tri-state outputs, their outputs could all be coupled directly to output 1381 without the need for multiplexer 1320.

Alternatively, an embodiment may have a single decoder 1310 with programmable coding parameters. These coding parameters may be held in a table, and decoder 1310 could be reprogrammed on-the-fly according to the nature of the incoming data, as determined by the coding identification.

Embodiments may place the deserializer 1074 after the spectral decoder 1180b, instead of before. In such embodiments, the spectral decoder 1180b handles serial data only. A parser would be required to read the coding identification bits from the incoming bit stream, to be able to select the correct decoder or coding parameters.

Figure 14:
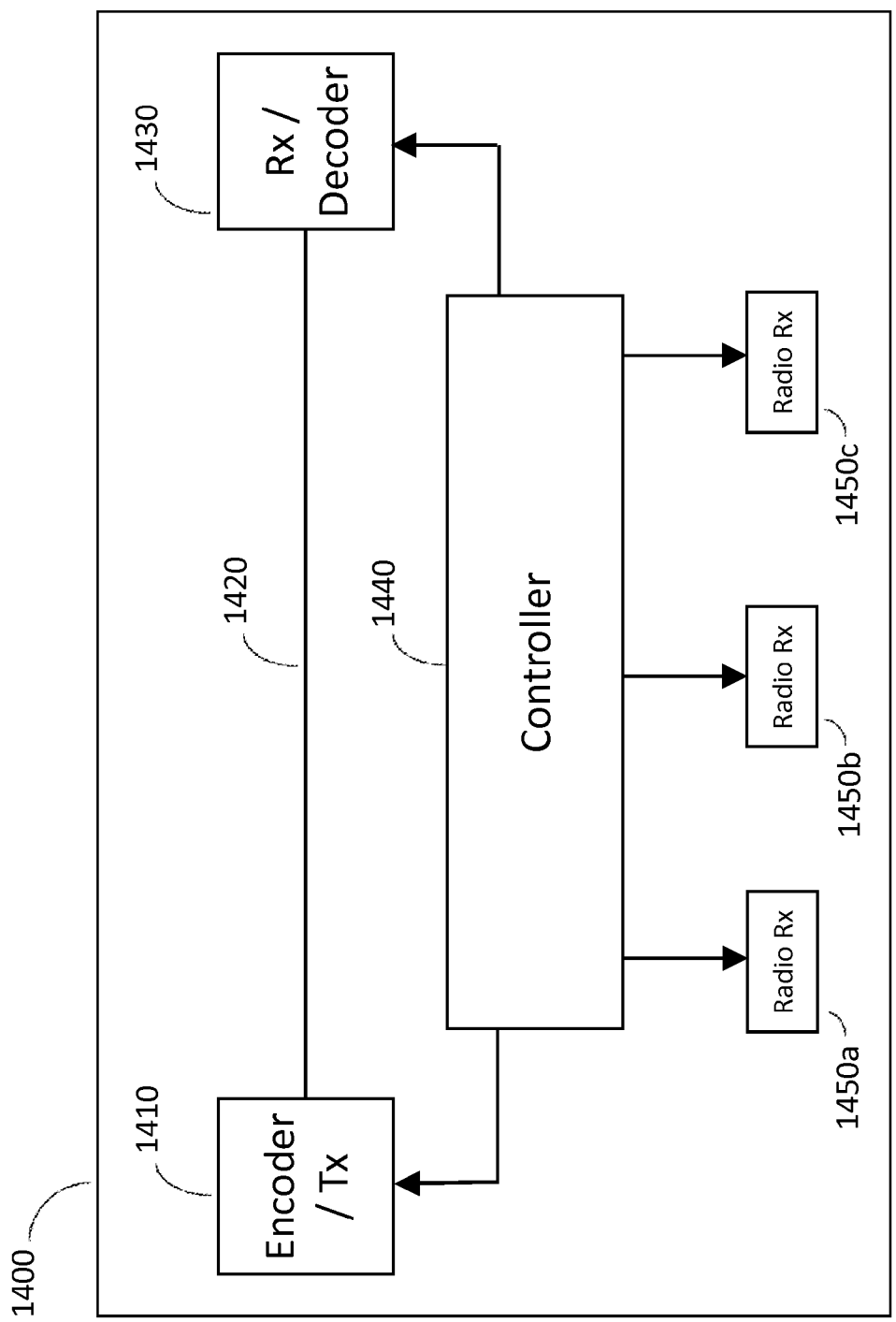
FIG. 14 illustrates a system with multiple radio receivers and a full wired interconnect according to an embodiment of the invention.

FIG. 14 illustrates a system 1400 with multiple radio receivers 1450a-c and a full wired interconnect 1410-1430 according to an embodiment of the invention. The multiple radio receivers 1450a-c may be physically separate, as shown, or alternatively some or all of them may be combined into multiband receivers, whose radio frequency receive band is controllable.

In many practical cases, only one of the receivers needs to be active. This is for instance the case in a cell phone that is capable of working in frequency bands in the 800, 900, 1800 and 1900-MHz ranges. Although signals may be present in each of those ranges, the cell phone would select a network in only one of the bands, and ignore the other bands. Therefore, EMI would need to be reduced in only one protected frequency band at a time (apart from WiFi, Bluetooth, etc.). When the phone switches to operate in a different frequency band, EMI optimization needs to switch, too.

Controller 1440 determines which radio 1450a-c and/or which frequency range is selected, in other words, which frequency band must be protected. Or, in embodiments, it may have a-priori knowledge or real time knowledge from trace sensing of which radios 1450a-c are active, are about to become active, or are about to be deactivated. When controller 1440 switches radio and/or frequency range, it also instructs encoder/transmitter 1410 to code the data according to another spectral profile, e.g. by changing the coding parameters. Accordingly, it instructs receiver/decoder 1430 to decode the receive data, undoing the coding by encoder/transmitter 1410. System 1400 may utilize a family of coding parameter configurations that can be pre-optimized for each combination of radio use cases and selected as needed by controller 1440.

The process of changing the spectral encoding on-the-fly may involve retiming the original high-speed signal, storing temporal portions of the signal, and retransmitting them with the new spectral coding. Additionally, in some instances, it may be advantageous to add overhead bits prior to and/or after the scrambling to assist with data framing, in order to (i) improve robustness to bit errors arising between the encoder/transmitter 1410 and receiver/decoder 1430; (ii) prevent excessively low-frequency content which can make reception at the receiver/decoder 1430 difficult; and (iii) generate better spectral reduction in the protected frequency bands, e.g. as illustrated by spectrum 710 in FIG. 7.

Figure 15:
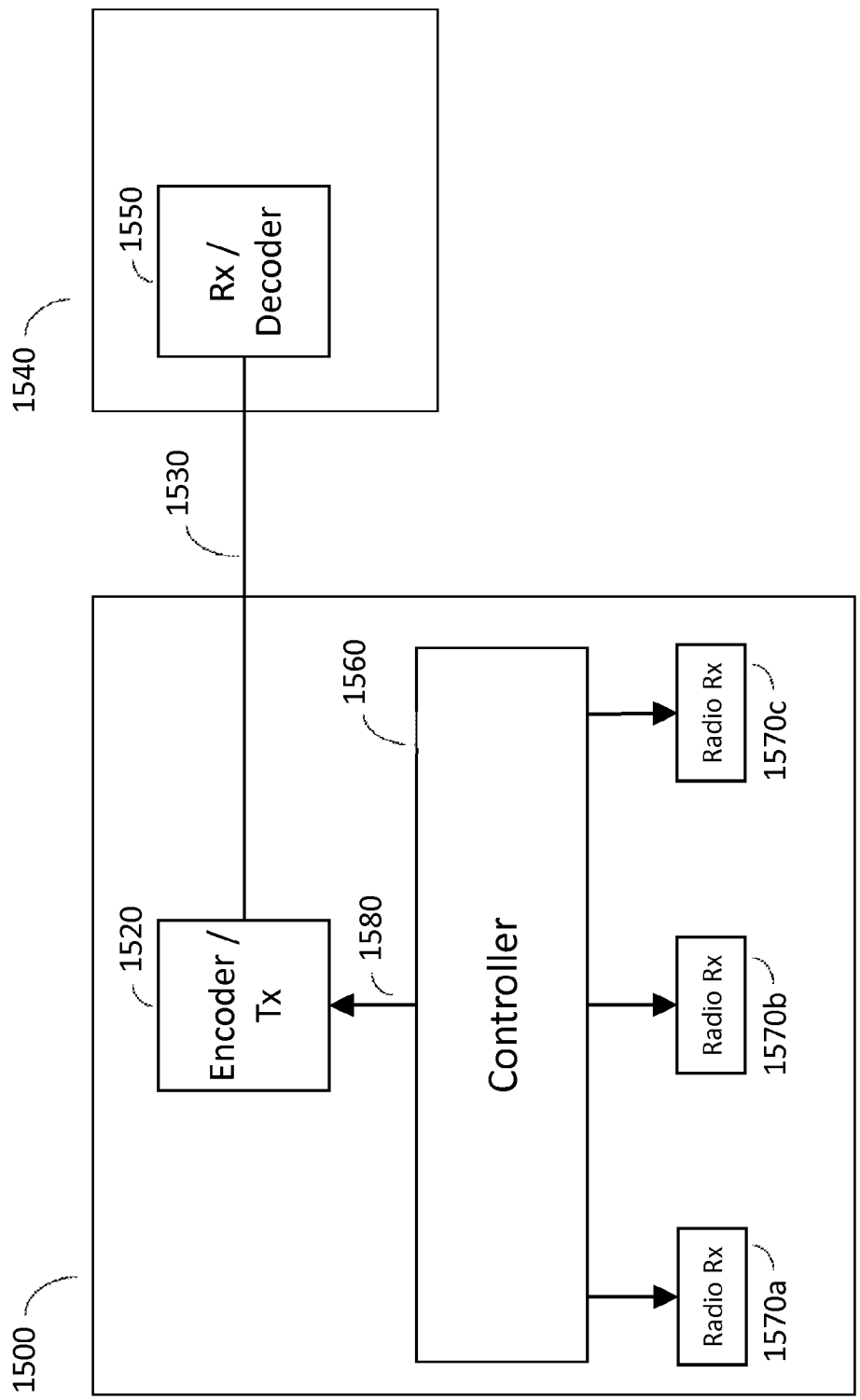
FIG. 15 illustrates a system with multiple radio receivers and a partial wired interconnect including an encoder/transmitter according to an embodiment of the invention.

FIG. 15 illustrates a system 1500 with multiple radio receivers 1570a-c and a partial wired interconnect 1520-1530 including an encoder/transmitter according to an embodiment of the invention. Encoder/transmitter 1520 and a first part of the wired link 1530 are located inside system 1500. Another system, 1540, comprises a last part of wired link 1530, as well as receiver/decoder 1550. Controller 1560 has the same functions as in FIG. 14; however, since it cannot directly control receiver/decoder 1550, the coding parameters and coding identification needs to be communicated indirectly to receiver/decoder 1550. In this embodiment, encoder/transmitter 1520 may for instance periodically transmit a preamble or framing header segment to pass the coding parameters to the receiver/decoder 1350. The coding identification is embedded in additional bits for each data word or data block, as the case may be.

Figure 16:
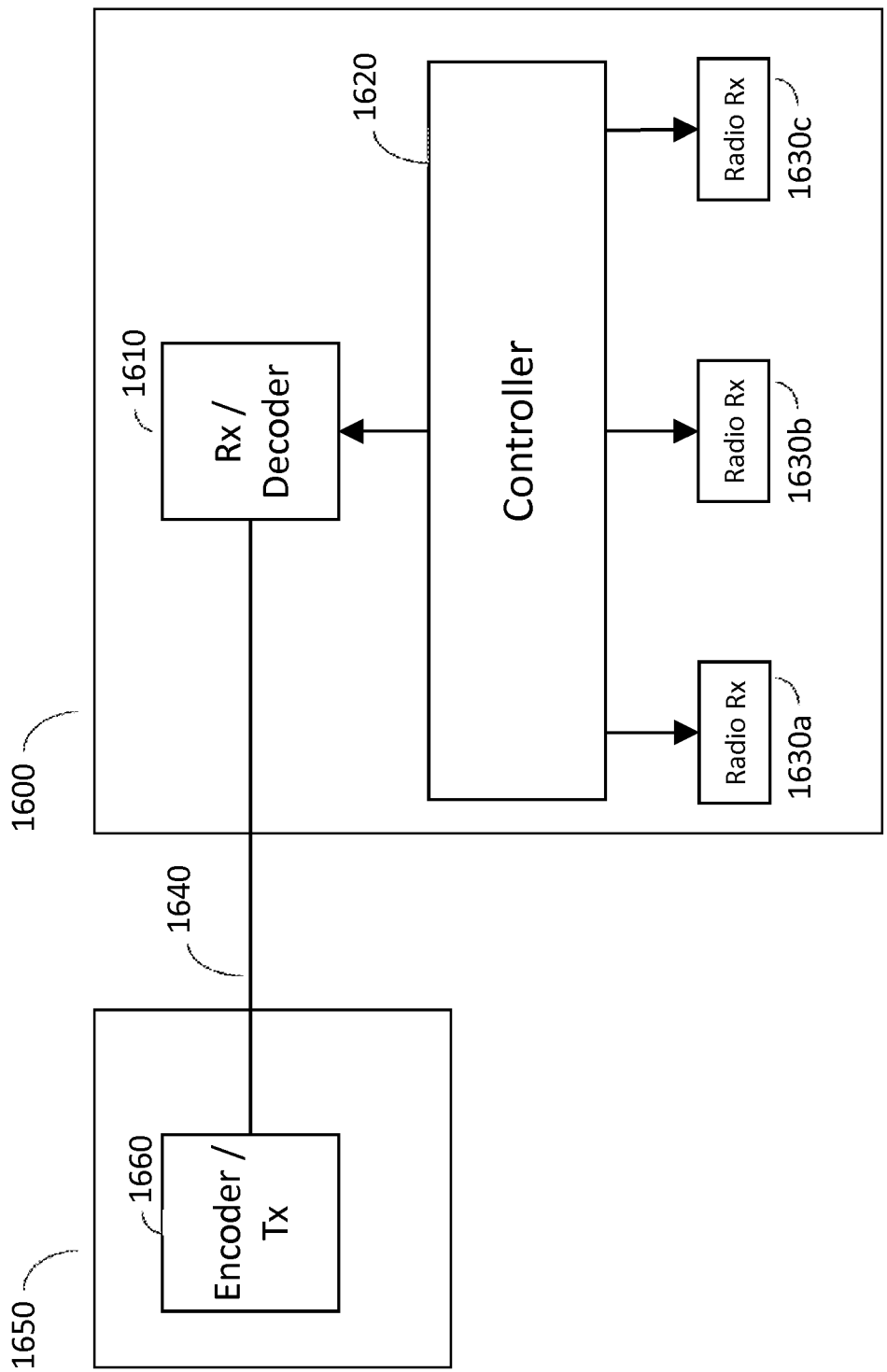
FIG. 16 illustrates a system with multiple radio receivers and a partial wired interconnect including a receiver/decoder according to an embodiment of the invention.

FIG. 16 illustrates a system 1600 with multiple radio receivers 1630a-c and a partial wired interconnect 1610, 1640 including a receiver/decoder 1610 according to an embodiment of the invention. Receiver/decoder 1610 and a last part of the wired link 1640 are located inside system 1600. Another system, 1650, comprises encoder/transmitter 1660, as well as a first part of wired link 1640. Controller 1620 has the same functions as in FIG. 14; however, it cannot directly control encoder/transmitter 1660. In some embodiments of the invention the protected frequency bands may be preprogrammed into encoder/transmitter 1660. For example WiFi bands in the 2.5 and 5-GHz bands may be protected de facto. In other embodiments of the invention, controller 1620 may signal to encoder/transmitter 1660 via receiver/decoder 1610 and wired link 1640 which frequency bands must be protected.

Figure 17:
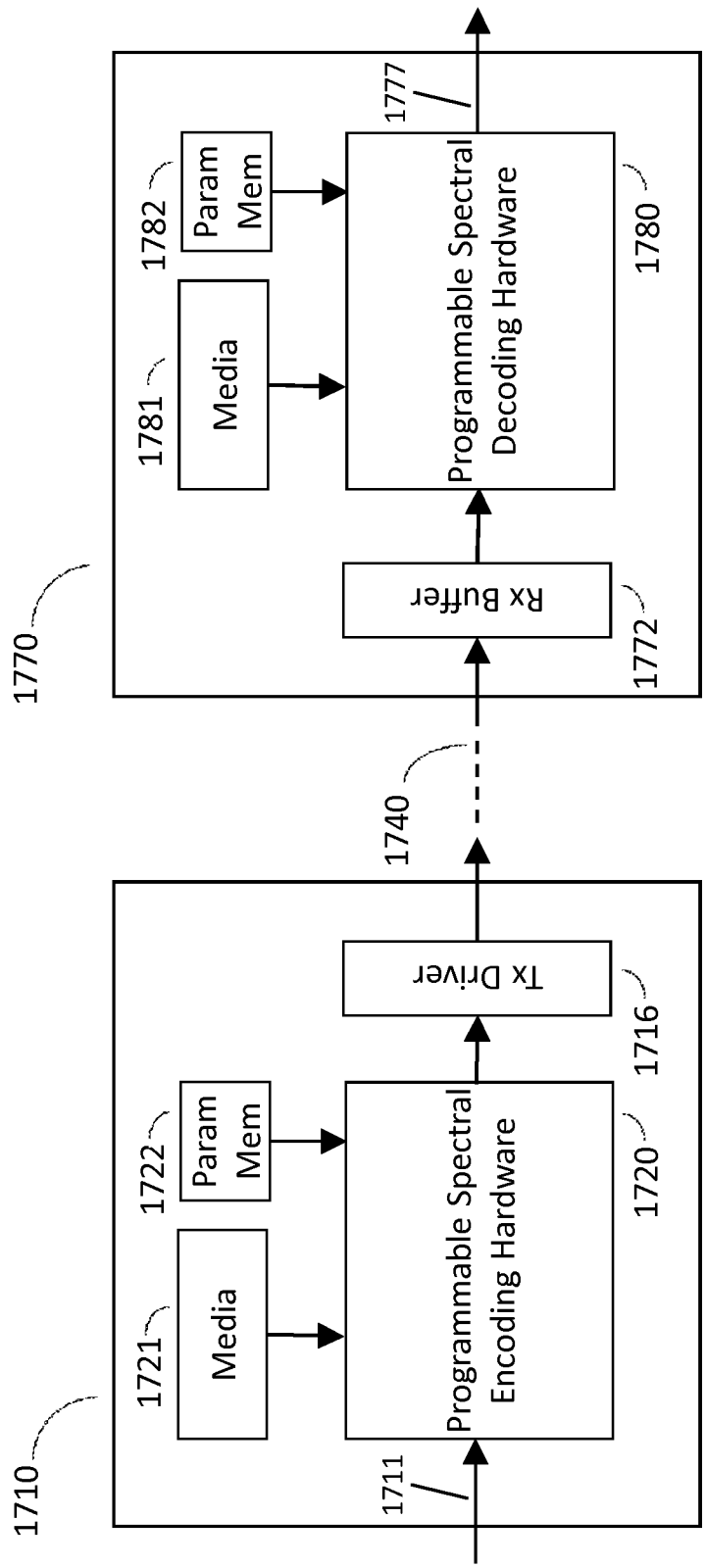
FIG. 17 illustrates programmable components of a wired link according to embodiments of the invention.

FIG. 17 illustrates programmable components of a wired link according to embodiments of the invention. Encoder/transmitter 1710 comprises programmable spectral encoding hardware 1720, such as a digital signal processor (DSP) or field-programmable gate array (FPGA), that is capable of spectrally encoding a data stream at its input 1711. The programmable spectral encoding hardware 1720 is coupled with a transmit driver 1716 capable of transmitting spectrally encoded high-speed data over wired link 1740.

Embodiments may comprise a parameter memory 1722 configured for storing coding parameters. Embodiments may also comprise a computer-readable media 1721 that includes instructions adapted to direct or configure programmable hardware 1720, such as a DSP or FPGA, for performing spectral encoding to reduce EMI in one or more protected frequency bands.

Receiver/decoder 1770 comprises a programmable spectral decoding hardware 1780, such as a DSP or FPGA, that is capable of spectrally decoding a data stream forwarded from receive buffer 1772, which is capable of receiving spectrally encoded high-speed data from wired link 1740.

Embodiments may comprise a parameter memory 1782 configured for storing coding parameters. Embodiments may also comprise a computer-readable media 1781 that includes instructions adapted to direct or configure programmable hardware 1780, such as a DSP or FPGA, for performing spectral decoding.

Although the description has been described with respect to particular embodiments thereof, these particular embodiments are merely illustrative, and not restrictive. Embodiments of the invention may single out, or combine, any of the techniques described herein. For instance, polynomial encoding may be used in combination with modification of the transmitter amplitude. Use of the techniques described herein does not in any way prevent the simultaneous use of conventional best practices such as keeping PCB traces short, or locating the radio receivers far from EMI sources. Some of the techniques may be implemented by dedicated hardware and circuitry, and some may equally well be implemented by programmable hardware, including signal processors and field-programmable devices.

It will be understood that the invention disclosed and defined in this specification extends to all alternative combinations of two or more of the individual features mentioned or evident from the text or drawings. All of these different combinations constitute various alternative aspects of the invention.

Although the description has been described with respect to particular embodiments thereof, these particular embodiments are merely illustrative, and not restrictive.

Any suitable technology for manufacturing electronic devices can be used to implement the circuits of particular embodiments, including bipolar, JFET, MOS, NMOS, PMOS, CMOS, BiCMOS, HBT, MESFET, FinFET, etc. Different semiconductor materials can be employed, such as silicon, germanium, SiGe, GaAs, InP, graphene, nanotubes, etc. Circuits may have single-ended or differential inputs, and single-ended or differential outputs. Terminals to circuits may function as inputs, outputs, both, or be in a high-impedance state, or they may function to receive supply power, a ground reference, a reference voltage, a reference current, or other. Although the physical processing of signals may be presented in a specific order, this order may be changed in different particular embodiments. In some particular embodiments, multiple elements, devices, or circuits shown as sequential in this specification can be operating in parallel.

Particular embodiments may be implemented in a computer-readable storage medium for use by or in connection with an instruction execution system, apparatus, system, or device. Particular embodiments can be implemented in the form of control logic in software, firmware, hardware or a combination of those. The control logic, when executed by one or more processors, may be operable to perform that which is described in particular embodiments.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

The invention claimed is:

1. A method for reducing electromagnetic interference in a radio receiver while transmitting high-speed data over a wired interconnect, comprising:
    selecting a first protected frequency band, the protected frequency band being a radio frequency range where reduced interference is desired;
    forwarding the high-speed data to a spectral encoder, the high-speed data having a first energy spectrum;
    in the spectral encoder, spectrally encoding the high-speed data to obtain encoded data with a second energy spectrum, with reduced energy in the first protected frequency band, wherein the spectrally encoding comprises:
        modifying statistical properties of the high-speed data
        spectrally encoding the high-speed data with a first set of coding parameters to obtain a first result;
        spectrally encoding the high-speed data with a second set of coding parameters to obtain a second result;
        calculating a first metric value based on energy content of the first result in the protected frequency band;

calculating a second metric value based on energy content of the second result in the protected frequency band; and selecting the one of at least the first and second results having the best metric value as the encoded data; and transmitting the encoded data over a wired interconnect.

2. The method of claim 1, wherein the spectrally encoding comprises scrambling the high-speed data.

3. The method of claim 1, wherein the spectrally encoding comprises scrambling the high-speed data with a polynomial.

4. The method of claim 3, further comprising:
selecting a second protected frequency band;
changing the polynomial to obtain encoded data with a third energy spectrum, with reduced energy in the second protected frequency band.

5. The method of claim 3, wherein scrambling includes using an additive scrambler.

6. The method of claim 3, wherein scrambling includes using a multiplicative scrambler.

7. The method of claim 1, further comprising:
generating a coding identification based on the selected one of the at least first and second results; and
associating the coding identification with the encoded data for transmission over the wired interconnect.

8. The method of claim 1, wherein the spectrally encoding comprises utilizing a block, algebraic, or convolutional code.

9. The method of claim 1, further comprising:
receiving the encoded data via the wired interconnect; and
spectrally decoding the encoded data to obtain decoded data which is digitally equivalent to the high-speed data.

10. The method of claim 9, further comprising:
receiving a coding identification via the wired interconnect; and
based on the coding identification, changing coding parameters used for the spectrally decoding.

11. An encoder for communicating digital data over a wired interconnect with reduced electromagnetic interference in at least one protected frequency band, the encoder comprising:
a data signal input configured to receive a data signal;
data signal encoders connected with the data signal input, wherein each data signal encoder is configured to output a different spectral encoding of the data signal;
a selector connected with the outputs of the data signal encoders and configured to select one of the different spectral encodings of the data signal having reduced electromagnetic interference in the at least one protected frequency band, wherein the selector is configured to determine metric values for each of the different spectral encodings of the data signal based on their respective spectral energy content in the at least one protected frequency band; and
a data signal output connected with the selector and configured to output the selected one of the different spectral encodings of the data signal.

12. The encoder of claim 11, further comprising a parameter memory configured for storing coding parameters for the data signal encoders.

13. The encoder of claim 11, wherein the selector is configured to further generate and output a coding identification based on the selected one of the different spectral encodings of the data signal.

14. The encoder of claim 11, wherein the data signal encoders are connected in parallel with the data signal input and configured to output the different spectral encodings of the data signal in parallel.

15. The encoder of claim 11, further comprising:
a tangible computer-readable medium including instructions and data adapted to configure programmable hardware to implement at least the data signal encoders.

16. A decoder for receiving digital data over a wired interconnect with reduced electromagnetic interference in at least one protected frequency band, the decoder comprising:
a data signal input configured to receive a data signal and a coding identification; and
one of:
a single data signal decoder connected with the data signal input, wherein coding parameters of the single data signal decoder are reprogrammed on-the-fly in accordance with the coding identification, and the single data signal decoder is configured to output different spectral decodings of the data signal based on the coding parameters;
a data signal output connected with an output of the single data signal decoder;
and:
multiple data signal decoders connected with the data signal input, wherein each of the multiple data signal decoders is configured to output a different spectral decoding of the data signal;
a selector connected with the outputs of the multiple data signal decoders and configured to on-the-fly select one of the different spectral decodings of the data signal based on the coding identification; and
a data signal output connected with the selector and configured to output the selected one of the different spectral decodings of the data signal.

17. The decoder of claim 16, further comprising:
a tangible computer-readable medium including instructions and data adapted to configure programmable hardware to implement at least the single or multiple data signal decoders.

* * * * *